Figure 1:
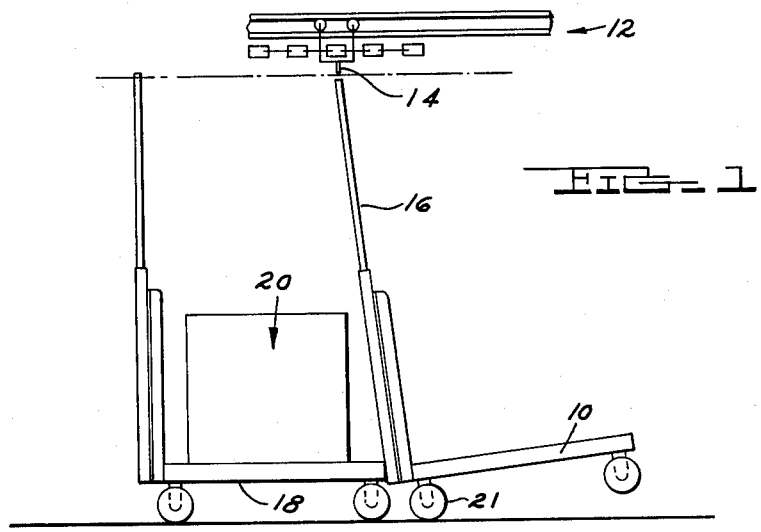

July 7, 1964  C. A. DEHNE  3,139,840
BUMPER CONSTRUCTION FOR TOW MAST FLOOR TRUCKS
Filed Nov. 13, 1962  2 Sheets-Sheet 2

INVENTOR.
CLARENCE A. DEHNE
BY Farley, Forster & Farley
ATTORNEYS

United States Patent Office 3,139,840
Patented July 7, 1964

3,139,840
BUMPER CONSTRUCTION FOR TOW MAST FLOOR TRUCKS
Clarence A. Dehne, Garden City, Mich., assignor to Jervis B. Webb Company, Detroit, Mich., a corporation of Michigan
Filed Nov. 13, 1962, Ser. No. 237,017
5 Claims. (Cl. 104—172)

This invention relates to an improved bumper construction for floor trucks of an overhead tow line system in which the floor trucks are each provided with an upwardly extending tow mast adapted to be drivingly engaged by a pusher of an overhead tow line, and particularly for a system of this type in which a driven floor truck is called upon to push a preceding non-driven floor truck. Such a requirement is found in tow line systems which incorporate non-powered spur lines and so-called "bump-off" switching. A truck diverted onto a non-powered spur line passes out of driving engagement with the pusher of the overhead tow line and stops until overtaken by a following driven truck which pushes it onto the spur line.

If a driven truck encounters a plurality of preceding diverted trucks, or if an unloaded driven truck encounters a preceding heavily loaded one, the frequent result is that the driven truck rears up under the combination of driving force imparted to its tow mast and pushing reaction, and loses driving engagement with the tow line or topples over into the path of travel or both.

The object of the present invention is to provide a bumper construction which will increase the resistance of a driven truck to rearing up under circumstances such as outlined above, and which will also increase the extent of overlapping engagement between the driven truck tow mast and pusher member of the drive line in the event rearing up does occur.

Another object is to provide a bumper construction which will improve the pushing action from a main to a spur line.

The invention provides, in a floor truck having a tow mast adapted to be drivingly engaged by the pusher of an overhead drive line, means tending to prevent loss of driving engagement when the driven floor truck is required to push a preceding floor truck and comprising a bumper projecting from the forward end of the driven truck and a shelf extending from the rear end of the preceding truck at a level slightly below that of the bumper whereby, upon the preceding truck being overtaken by the driven truck, the bumper will extend above the shelf in overlapping relation therewith and the shelf will form a surface upon which the driven truck must pivot on its bumper in order to rear up under the driving force from the drive line pusher to the tow mast. Preferably, the bumper pojects forwardly from the base of the tow mast to provide the greatest possible moment from the weight of the truck and any load it may be carrying to resist pivotal movement; and also so that if any pivoting of the truck on its bumper does occur, the tow mast will at first be raised into greater overlapping engagement with the tow line pusher.

Another preferred feature is to incorporate a weight as part of the shelf structure secured to the rear of each truck. Preferably also, the bumper of a driven truck is shaped so as to include a first pushing portion which extends transversely normal to the longitudinal center line of the truck and a second pushing portion which is rearwardly inclined to the longitudinal center line of the truck and which faces in the general direction of spur line travel.

Figure 2:
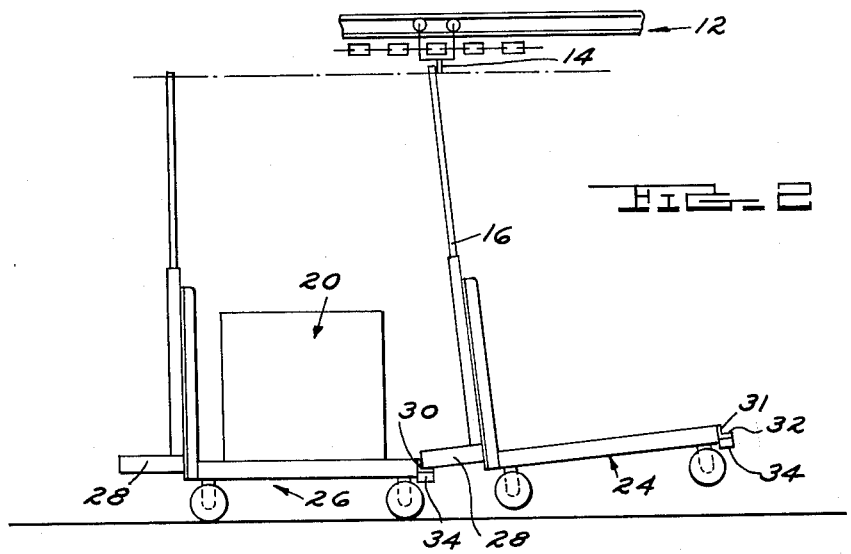
Figure 3:
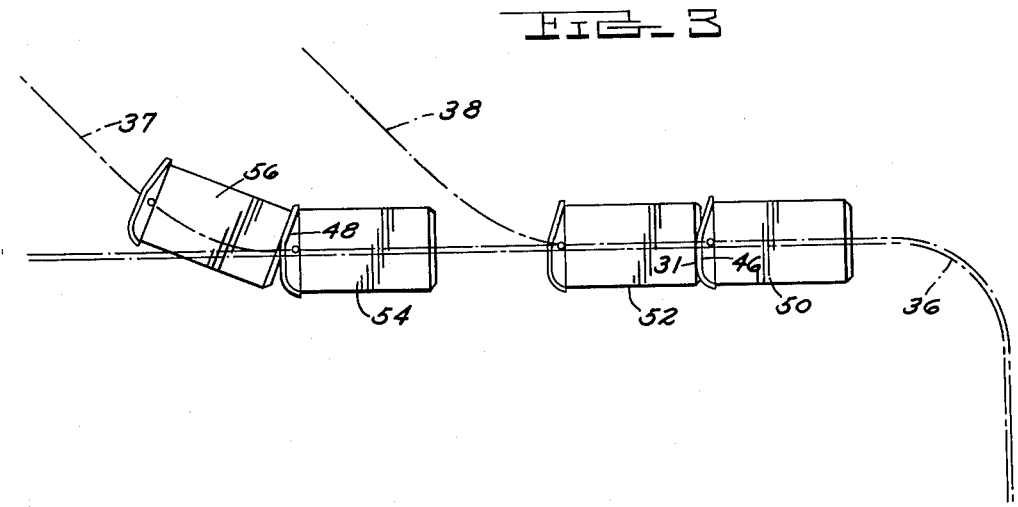
Figure 4:
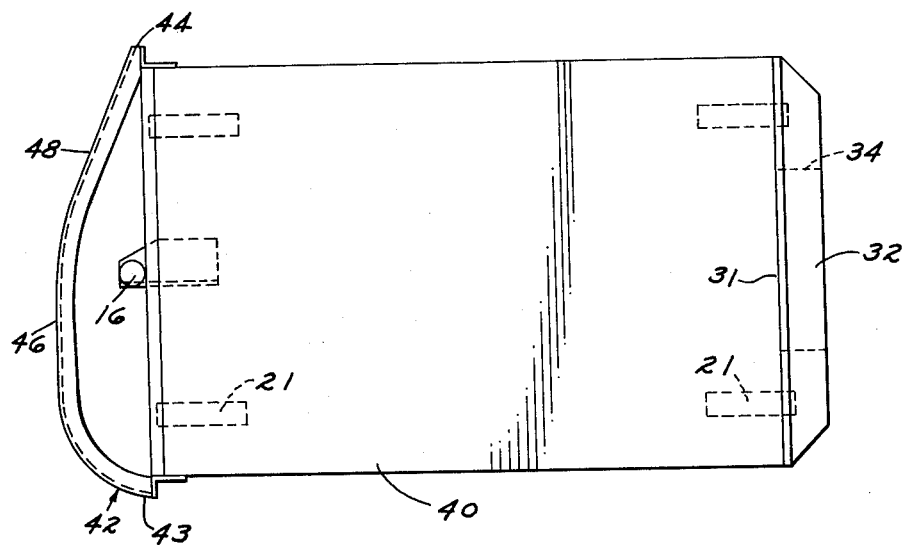

Other objects and advantages will appear from the following description of the presently preferred representative embodiment of the invention disclosed in the accompanying drawings which consist of the following views:

FIGURE 1, a schematic side elevation showing the normal condition which occurs when a driven truck is called upon to push too great a load;

FIGURE 2, a side elevation similar to FIG. 1 but showing the action which occurs when the trucks are equipped with the structure of the invention;

FIGURE 3, a schematic plan view showing the pushing action obtained from the improved bumper construction of the invention; and FIGURE 4, an enlarged plan view of a truck.

Referring to FIG. 1, an empty truck 10, driven from an overhead tow line 12 by a pusher 14 thereof engaging an upwardly projecting tow mast 16 of the truck, has overtaken a preceding non-driven truck 18 carrying a heavy load 20. The pushing reaction is so great that truck 10 pivots on its front wheels 21 and rears up causing its tow mast 16 to swing forwardly and downwardly out of engagement with the pusher 14.

FIGURE 2 shows the same condition except that the driven truck 24 and preceding loaded truck 26 are equipped with the structure of the present invention. Driven truck 24 is provided with a bumper 28, rigidly secured to the truck and projecting forwardly of the base of the tow mast 16. The preceding truck 26 is provided with a rear bumper member 30 of angle section having a vertical surface 31 for pushing engagement by the bumper 28 and a rearwardly extending horizontal surface 32 which is at a level slightly below that of the lower surface of the bumper 28 so as to be overlapped thereby when the bumper 28 of the driven truck 24 overtakes and engages the rear of a preceding non-driven truck 26. The surface 32 thus acts as a shelf or ledge upon which the driven truck 24 must pivot on its bumper in order to rear up as shown, and if this pivoting action takes place, it results in an upward movement of the tow mast 16 into increased overlapping engagement with the pusher 14.

Preferably a weight 34 is carried beneath the ledge surface 32 to provide an increased moment of resistance to rearing up.

FIGURES 3 and 4 illustrate a preferred form of bumper construction for bump-off switching operations. Many tow line installations which incorporate bump-off switching are arranged as shown in FIG. 3 with a main line 36 from which spur lines 37 and 38 extend in the same relative direction. For improved pushing action and decreased tendency of the driven truck to tip over when pushing a non-driven one, the truck 40 shown in FIG. 4 is provided with a channel section front bumper 42 whose ends 43 and 44 extend beyond the sides of the truck and which is formed with a first pushing portion 46 extending transversely normal to the longitudinal center line of the truck and a second pushing portion 48 which is rearwardly inclined to the longitudinal center line of the truck and which faces in the general direction of spur line travel. Truck 40 is equipped at its rear with an angle section bumper member such as previously described including a vertical face 31 and rearwardly projecting horizontal ledge 32 under which a weight 34 is mounted.

In FIG. 3, driven truck 50 is shown with the portion 46 of its front bumper engaging the rear face 31 of the preceding truck 52 which is to be diverted onto spur line 38. Driven truck 54 is engaging the preceding non-driven truck 56 being diverted onto spur line 37 with the rearwardly inclined pushing portion 48 of its bumper, and a comparison of the two conditions illustrated readily shows the improved pushing contact obtained in which the reaction force tends to be directed toward the tow mast of the driven truck and in which a substantial transverse bumper area overlies the rearwardly extending ledge of the truck being pushed, especially at the time of initial contact. This combination of factors minimizes the likelihood of the driven or pushing truck tipping over out of engagement with the tow line.

Laterally projecting terminal portions 43 and 44 of the bumper 42 insure that diverted trucks are pushed clear of the main line.

While preferred embodiments have been described above in detail, it will be understood that numerous modifications might be resorted to without departing from the scope of the invention as defined in the following claims.

I claim:

1. In a floor truck tow line system wherein wheeled floor trucks each having an upwardly extending tow mast are driven by pusher members of an overhead tow line and wherein a driven floor truck is employed to push one or more preceding non-driven floor trucks onto a spur line, means for increasing the driving force transmissable from the tow line through a driven floor truck comprising a bumper member secured to the front of the driven truck and projecting forwardly of the base of the tow mast thereof, a bumper surface on the rear of a non-driven truck for pushing engagement by the bumper member of the driven truck, and a ledge member rigidly carried by the non-driven truck and projecting rearwardly of and below the bumper surface thereof and slightly below the level of the bumper member of the driven truck whereby, upon pushing engagement between the driven truck and a preceding non-driven truck, any rearing up movement of the driven truck will result in a pivoting of the driven truck about its bumper member on the ledge member of the non-driven truck and an upward movement of the driven truck tow mast.

2. A floor truck tow line system according to claim 1 in which the means for increasing the transmissable driving force are further characterized by a weight secured to the driven truck adjacent the rear end thereof to increase the resistance to pivoting about its bumper member.

3. A floor truck tow line system according to claim 1 further characterized by the bumper member of the driven truck including a first pushing portion extending transversely normal to the longitudinal center line of the truck and a second pushing portion which is rearwardly inclined to the longitudinal centerline of the truck and which faces the general direction of spur line travel.

4. In a floor truck having a tow mast adapted to be drivingly engaged by a pusher of an overhead drive line, means tending to prevent loss of driving engagement when the driven floor truck is required to push a preceding floor truck comprising a bumper projecting from the forward end of the driven truck and a shelf extending from the rear end of the preceding truck at a level slightly below that of the bumper whereby, upon the preceding truck being overtaken by the driven truck, the bumper will extend above the shelf in overlapping relation therewith and the shelf will form a surface upon which the driven truck must pivot on its bumper in order to rear up under the driving force from the drive line pusher to the tow mast of the driven truck.

5. A bumper construction according to claim 3 further characterized by said bumper member having a length greater than the width of the truck and being mounted with its ends extending beyond the sides of the truck.

References Cited in the file of this patent
UNITED STATES PATENTS

| | | |
|---|---|---|
| 867,367 | Hedley | Oct. 1, 1907 |
| 2,936,718 | Bradt et al. | May 17, 1960 |
| 3,073,641 | Tracy | Jan. 15, 1963 |